(12) United States Patent  (10) Patent No.: US 7,900,768 B2
Fourney  (45) Date of Patent: Mar. 8, 2011

(54) SPLIT-LEVEL SINGULATOR

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 56 days.

(21) Appl. No.: 12/528,635

(22) PCT Filed: Apr. 4, 2008

(86) PCT No.: PCT/US2008/059458
§ 371 (c)(1),
(2), (4) Date: Aug. 26, 2009

(87) PCT Pub. No.: WO2008/124626

PCT Pub. Date: Oct. 16, 2008

(65) Prior Publication Data

US 2010/0065403 A1   Mar. 18, 2010

Related U.S. Application Data

(60) Provisional application No. 60/910,152, filed on Apr. 4, 2007.

(51) Int. Cl.
*B65G 47/26* (2006.01)
(52) U.S. Cl. ..................... 198/779; 198/817; 198/457.02
(58) Field of Classification Search .................. 198/779, 198/817, 457.02, 370.09
See application file for complete search history.

(56) References Cited

U.S. PATENT DOCUMENTS

| | | | |
|---|---|---|---|
| 3,656,488 A | | 4/1972 | Dumanowski et al. |
| 3,912,072 A | * | 10/1975 | Kornylak ...................... 198/779 |
| 4,003,466 A | * | 1/1977 | Muth et al. .................... 198/452 |
| 4,482,061 A | * | 11/1984 | Leverett ........................ 209/592 |
| 6,318,544 B1 | * | 11/2001 | O'Connor et al. ............ 198/853 |
| 6,494,312 B2 | | 12/2002 | Costanzo |
| 6,523,672 B2 | | 2/2003 | Greve |
| 6,571,937 B1 | * | 6/2003 | Costanzo et al. ............. 198/779 |
| 6,758,323 B2 | | 7/2004 | Costanzo |
| 6,968,941 B2 | | 11/2005 | Fourney |
| 7,007,792 B1 | * | 3/2006 | Burch ...................... 198/457.02 |
| 7,191,894 B2 | | 3/2007 | Fourney |
| 7,311,192 B2 | | 12/2007 | Fourney |
| 2005/0023105 A1 | * | 2/2005 | Costanzo et al. ....... 193/35 MD |

* cited by examiner

*Primary Examiner* — Mark A Deuble
(74) *Attorney, Agent, or Firm* — James T. Cronvich

(57) ABSTRACT

A split-level singulator for arranging and conveying articles in a single file. The singulator comprises a central conveyor and two flanking conveyors advancing in a conveying direction. Rollers in the conveyors protrude through the thickness of the conveyors and ride on underlying supporting bearing surfaces that cause the rollers to rotate as the conveyors advance in the conveying direction. The rollers in the central conveyor rotate in the conveying direction. The rollers in the flanking conveyors rotate in directions oblique to the conveying direction to direct articles conveyed atop the rollers downstream and toward the central conveyor. The tops of the rollers of the central conveyor are vertically offset above or below the tops of the flanking oblique rollers.

7 Claims, 4 Drawing Sheets

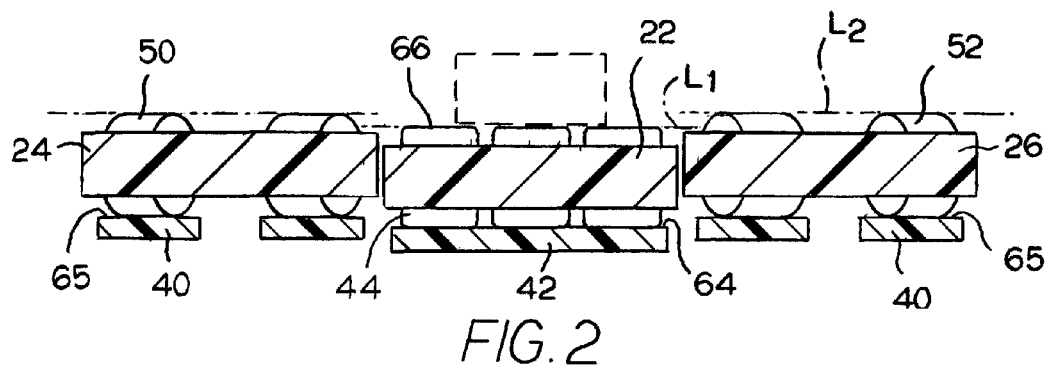
FIG. 2
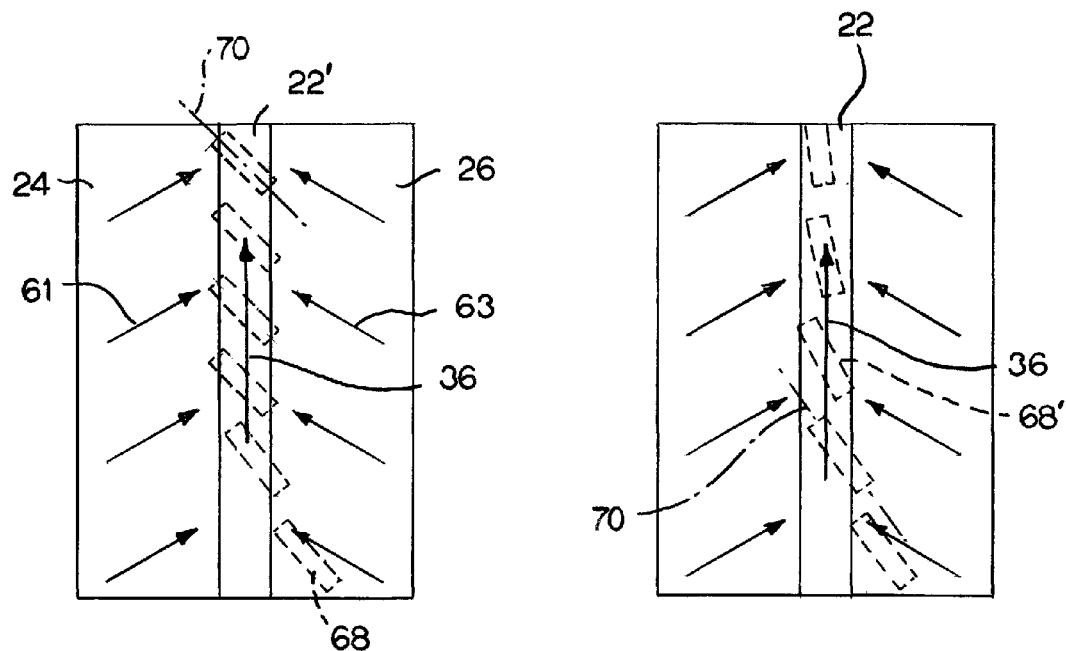
FIG. 3
PRIOR ART
FIG. 4

SPLIT-LEVEL SINGULATOR

BACKGROUND

The invention relates to power-driven conveyors generally and, more particularly, to singulating conveyors for aligning a mass of conveyed articles in a single file.

One version of singulator is realized as a central conveyor belt with rollers arranged to rotate on axes perpendicular to the direction of the belt travel. These in-line rollers protrude through the thickness of the belt and ride on a conveyor pan below the belt along a carryway. The article-supporting portions of the rollers protruding past the top of the belt rotate in the direction of belt travel to push conveyed articles forward along the belt and separate them from trailing articles. Flanking the central belt are two belts with rollers arranged to rotate on axes oblique to the direction of belt travel. The rollers on each side of the central belt rotate to push conveyed articles toward the central belt and into a single file. The combined action of the oblique and in-line rollers also tends to orient the articles with their major axes parallel to the direction of belt travel. Like the rollers in the central belt, the rollers in the flanking belts protrude through the thickness of the belts and ride on bearing surfaces underlying the belts. The three belts are coplanar with the rollers all tangent to a common plane.

One problem with such a singulator is that large articles that are wider than the width of the central belt tend to rock laterally back and forth when they are more or less centered on the singulator, but still contacting the oblique rollers on both of the flanking belts. Another problem is that narrow articles that fit entirely or almost entirely on the central belt do not orient well because they do not receive the simultaneous rotational effect caused by sufficient contact with enough rollers arranged at different angles.

Thus, there is a need for a singulating conveyor that minimizes these problems.

SUMMARY

These problems are overcome by a singulator embodying features of the invention. One version of a singulator comprises first, second, and third conveyors advancing in a conveying direction. The second and third conveyors flank the first conveyor on opposite sides. Each of the conveyors has rollers that protrude through the thickness of the conveyors. The rollers are arranged to rotate in different directions. The peripheries of the rollers protruding above the first conveyor rotate in the conveying direction. The peripheries of the rollers protruding above the second and third conveyors rotate oblique to the conveying direction and toward the first conveyor. The rollers rotate on bearing surfaces disposed below the first, second, and third conveyors. The tops of the peripheries of the rollers in the first conveyor all extend to a first level. The tops of the peripheries of the rollers in the second and third conveyor belts all extend to a second level that is above or below the first level.

BRIEF DESCRIPTION OF THE DRAWINGS

These features of the invention, as well as other aspects and advantages, are better understood by referring to the following descriptions, appended claims, and accompanying drawings, in which:

FIG. 2 is a cross section of the singulator taken along lines 2-2 of FIG. 1, showing a lowered central conveying region;

FIG. 3 is a top plan diagram of a prior art singulator illustrating a problem with conveying narrow articles;

FIG. 4 is a top plan diagram of the singulator of FIG. 1, illustrating the handling of narrow packages;

DETAILED DESCRIPTION

Figure 1:
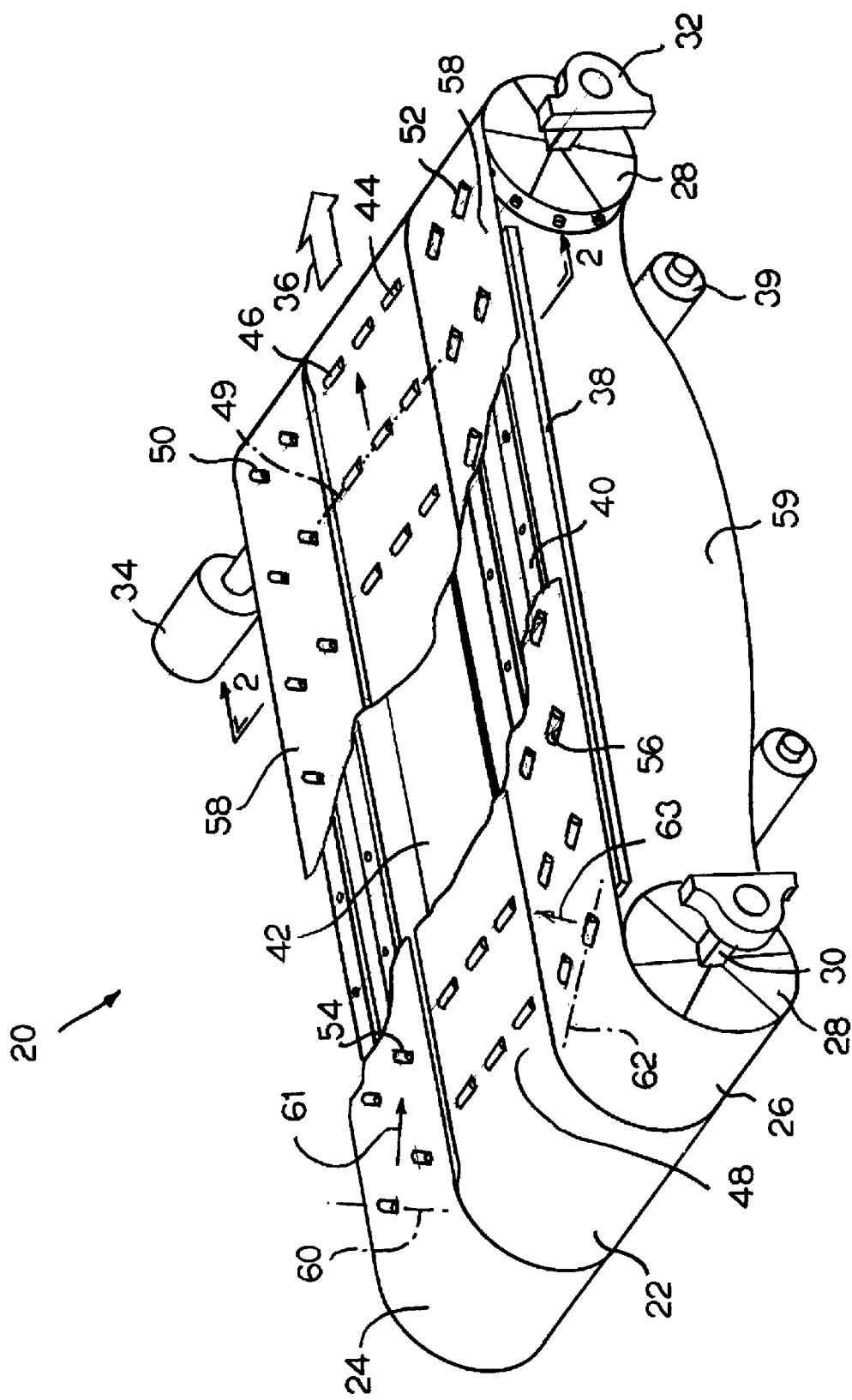
FIG. 1 is an isometric view, partly cut away, of one version of a singulator embodying features of the invention.

An exemplary version of a conveyor suitable for singulating conveyed articles in shown in FIG. 1. The singulator 20 includes a first conveyor 22 flanked on opposite sides by second and third conveyers 24, 26. All three conveyers in this example are individual endless conveyor belts looped around pulleys or sprocket sets 28, which are mounted on shafts 30 rotatably supported in bearing blocks 32 attached to a conveyor frame (not shown). A motor 34 coupled to the shaft at one end of the singulator drives the conveyor belts in the conveying direction indicated by arrow 36. The conveyor belts are supported along a carryway by one or more carryway pans 38 mounted in the conveyor frame. Shoes or rolls 39 reduce the sag in the belts in the returnway path. Linear wearstrips 40 attached to the pan form lanes running in the lengthwise direction of the singulator. The wearstrips support the two flanking belts 24, 26 along the carryway. A sheet 42 underlies and supports the central belt 22. The wearstrips could alternatively be replaced by a sheet or the sheet replaced by linear wearstrips.

The central conveyor belt 22 includes rollers 44 that reside in cavities 46 formed in the belt. The cavities open onto the top surface 48 and the opposite bottom surface of the belt. Salient portions of the rollers protrude above and below the belt beyond the top and bottom surfaces. Conveyed articles ride atop the rollers on the carryway. The sheet 42, which acts as a bearing surface, contacts and supports the rollers below the belt along the carryway. As the central belt is driven in the conveying direction, the relative motion between the belt and the sheet causes the rollers to rotate. The rollers are arranged to rotate on axes 43 perpendicular to the conveying direction, which means that the tops of the peripheries of the rollers above the belt rotate in the conveying direction. An article atop these rollers is pushed forward relative to the belt.

The flanking conveyor belts 24, 26 have rollers 50, 52 mounted in cavities 54, 56 arranged to provide components of motion in both the conveying direction and a lateral direction toward the central belt. Like the rollers 44 on the central belt, the rollers in the flanking belts protrude past top and bottom surfaces 58, 59 of the belts and ride on the underlying wearstrips 40. The rollers 50 on the second conveyor belt 24 rotate about first axes 60 oblique to the conveying direction. Articles conveyed atop the rollers in the second belt are directed downstream and toward the central conveyor in the direction of arrow 61. The third conveyor belt 26 is a mirror image of the second belt. Its rollers 52 rotate about second axes 62 oblique to the conveying direction. Articles conveyed atop these rollers are pushed downstream and toward the central conveyor belt in the direction of arrow 63.

Figure 7:
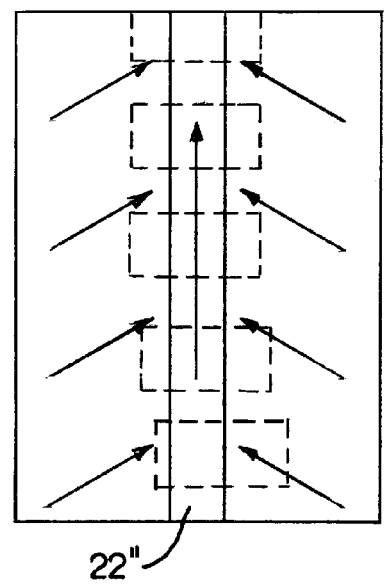
FIG. 7 is a top plan diagram of the singulator of FIG. 5, illustrating the handling of wide packages.

As shown in FIG. 1, but better in FIG. 7, the central conveyor belt 22 resides lower in the conveyor frame than the two flanking oblique-roller belts 24, 26. This is achieved in this example by vertically offsetting the top bearing surface 64 of the central carryway sheet 42 below the level of the top bearing surfaces 65 of the wearstrips 40 supporting the flanking belts. In this way the tops 66 of the peripheries of the in-line rollers 44 on the central belt are at a first level $L_1$ below the level $L_2$ of the tops 67 of the peripheries of the oblique rollers 50, 52 in the flanking belts.

The operation of the singulator with the lowered central belt is shown in FIG. 4 in contrast with the operation of a conventional one-level singulator in FIG. 3. In the conventional singulator, a narrow article 68 is directed toward the central belt 22', which is at the same level as the flanking belts. Once the article is more or less centered on the conveyor, only a small part of it may extend beyond the central conveyor onto either of the flanking conveyors 24, 26 with the oblique rollers. As a consequence, the article is supported atop many more of the central belt's in-line rollers than the flanking belts' oblique rollers, and there is not enough relative force exerted by the oblique rollers to cause the article to rotate its major axis 70 in line with the conveying direction 36—the preferred orientation of the article. With the central conveyor lower, as in FIG. 4, the article 68' bridging the two flanking conveyors is largely out of contact with the in-line rollers in the lower central conveyor 22. The outer ends of the article are then subjected to the lateral components of force extended by the oblique rollers, which tend to rotate and align the article with its major axis 70 in the conveying direction.

Figure 5:
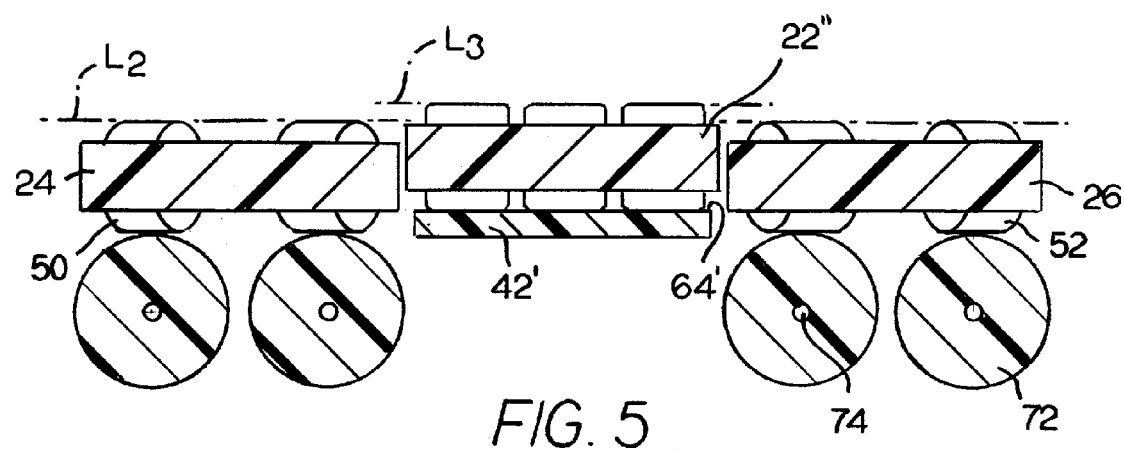
FIG. 5 is a cross sectional view as in FIG. 2 of another version of a singulator with a raised central conveying region.

Another version of a singulator in which the central conveyor is vertically offset from the flanking oblique-roller conveyors is shown in FIG. 5. In this example, the wearstrips of FIG. 2 are replaced with longitudinal rollers 72 that are free to rotate on axles 74 aligned in the conveying direction. These longitudinal rollers decrease slip between the oblique rollers 50, 52 and the outer bearing surfaces of the longitudinal rollers, especially for roller angles above 30° off the conveying direction. But flat wearstrips or other flat bearing surfaces could be used in the example of FIG. 5, and the longitudinal rollers could be used under the oblique rollers in the singulator of FIG. 2. The central conveyor belt 22" is shown raised relative to the flanking belts 24, 26. This is achieved by raising the level of the bearing surface 64' of the carryway sheet 42' to a level above the tops of the underlying longitudinal rollers. The raised level $L_3$ of the tops of the rollers is preferably about 0.3 cm (⅛ in) above the level $L_2$ of the tops of the oblique rollers. (In FIG. 2, the level $L_1$ of the tops of the rollers of the central conveyor is preferably about 0.3 cm below the level $L_2$ of the tops of the oblique rollers.)

Figure 6:
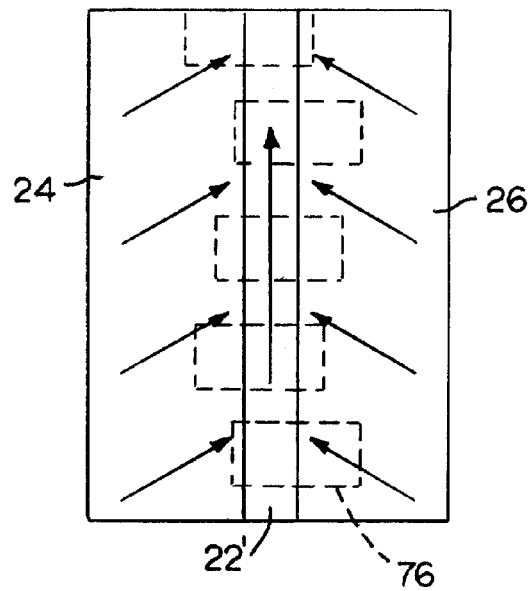
FIG. 6 is a top plan diagram of a prior art singulator as in FIG. 3 illustrating a problem with conveying wide articles.

The operation of a conventional one-level singulator conveying wide articles is shown in FIG. 6. Because a wide article 76 that is more or less centered extends onto both the flanking conveyors 24, 26, as well as the level central conveyor 22', there is a tendency for the article to rock laterally back and forth as more or less of the oblique rollers of one of the flanking conveyors engage the articles. With the central conveyor 22" raised as in FIG. 5, the more-or-less-centered article 76 is more stably conveyed atop the slightly raised in-line rollers of the central conveyor largely out of contact with the oblique rollers in the flanking conveyors. Thus, rocking of the centered article is reduced.

Figure 8:
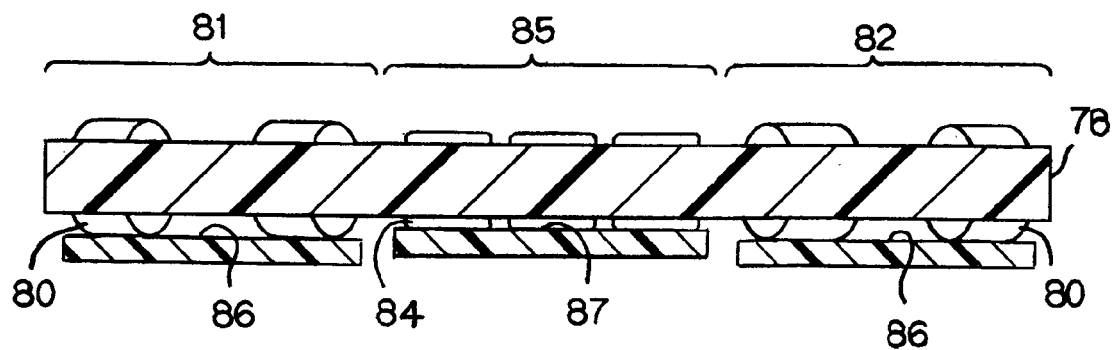
FIG. 8 is a cross section as in FIG. 2 of another version of singulator with smaller-diameter rollers in the central conveying region.

Another version of a singulator for narrow articles is shown in FIG. 8. In this version, the singulator is constructed of a single conveyor belt 78 with obliquely arranged rollers 80 in flanking regions 81, 82 of the belt and with in-line rollers 84 in a central region 85. The rollers ride on bearing surfaces 86, 87 underlying the belt. The in-line rollers 82 have a smaller diameter than oblique rollers 80. Because the tops of the smaller in-line rollers are at a lower level than the tops of the oblique rollers, this singulator operates as shown in FIG. 4. To accommodate the smaller-diameter in-line rollers, the bearing surface 87 underlying them is raised above the level of the bearing surfaces 86 underlying the oblique rollers.

Figure 9:
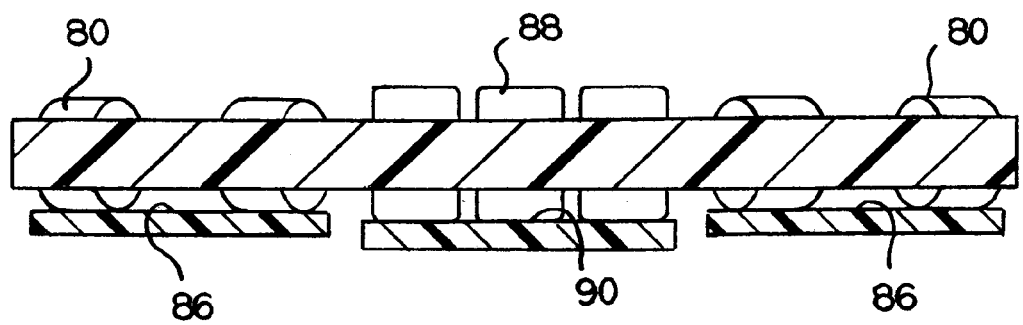
FIG. 9 is a cross section as in FIG. 5 of another version of singulator with larger-diameter rollers in the central conveying region.

Another version of a singulator that operates as shown in FIG. 7 is depicted in FIG. 9. This one-belt singulator has larger-diameter in-line rollers 88 in the central region. The tops of the larger-diameter rollers lie at a level above the level of the tops of the peripheries of the flanking oblique rollers 80. To accommodate the larger-diameter rollers, the bearing surface 90 underlying the in-line rollers is lower than the bearing surfaces 86 underlying the smaller oblique rollers. Thus, this singulator operates in the same way as the singulator in FIG. 5.

Although the invention has been described with reference to a few preferred versions, other versions are possible. For example, the central conveyor could alternatively be raised or lowered by vertically offsetting the axles on which the rollers rotate. As another example, the vertical offset between the oblique and the in-line rollers may be slightly more or less than 0.3 cm. So, as these examples suggest, the claims are not meant to be limited to the details of the preferred versions.

What is claimed is:

1. A singulator comprising:
    a first conveyor advancing in a conveying direction, the first conveyor having rollers protruding through the thickness of the first conveyor with the rollers' peripheries protruding above the first conveyor arranged to rotate in the conveying direction, wherein the tops of the rollers' peripheries all extend to a first level;
    second and third conveyors flanking the first conveyor on opposite sides and advancing in the conveying direction;
    wherein the second and third conveyors have rollers protruding through the thickness of the second and third conveyors with the rollers' peripheries protruding above the second and third conveyors arranged to rotate oblique to the conveying direction and toward the first conveyor, wherein the tops of the rollers' peripheries all extend to a second level unequal to the first level;
    bearing surfaces disposed below the first, second, and third conveyors on which the rollers in the first, second, and third conveyors roll as the conveyors advance in the conveying direction.

2. A singulator as in claim 1 wherein the first level is below the second level.

3. A singulator as in claim 1 wherein the first level is above the second level.

4. A singulator as in any preceding claim wherein the first, second, and third conveyors are individual abutting first, second, and third conveyor belts.

5. A singulator as in claim 4 wherein the first conveyor belt is supported in a different plane from the second and third conveyor belts.

6. A singulator as in claim 1 wherein the rollers in the first conveyor have a different radius from the rollers in the second and third conveyors.

7. A singulator as in claim 1 wherein the first, second, and third conveyors are contiguous regions across the width of a single conveyor belt.

* * * * *